(12) United States Patent
Konno et al.

(10) Patent No.: US 8,172,587 B2
(45) Date of Patent: *May 8, 2012

(54) CARD CONNECTOR AND DETECTION SWITCH

(75) Inventors: Takeshi Konno, Tokyo (JP); Katsuhiro Hori, Tokyo (JP); Makoto Watanabe, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 12/851,147

(22) Filed: Aug. 5, 2010

(65) Prior Publication Data

US 2011/0031094 A1    Feb. 10, 2011

(30) Foreign Application Priority Data

Aug. 6, 2009    (JP) .................................. 2009-183760

(51) Int. Cl.
*H01R 29/00*    (2006.01)
(52) U.S. Cl. ............................ 439/188; 439/62; 439/632
(58) Field of Classification Search ..................... 439/62, 439/188, 630–632
See application file for complete search history.

(56) References Cited

U.S. PATENT DOCUMENTS 7,955,103 B2 *    6/2011    Konno et al. ................. 439/188
2006/0116027 A1 *    6/2006    Tseng et al. .................. 439/630
2010/0009552 A1 *    1/2010    Konno et al. .................... 439/59
2011/0031094 A1 *    2/2011    Konno et al. ............... 200/51.09

FOREIGN PATENT DOCUMENTS

JP    2002-324629 A    11/2002
JP    2003-022870 A    1/2003

* cited by examiner

*Primary Examiner* — James Harvey
(74) *Attorney, Agent, or Firm* — Washida & Associates

(57) ABSTRACT

The card connector can adequately detect the state in which an electronic device such as a memory card to be inserted and removed is fitted, and saves the footprint for mounting the card connector. With this card connector, a card detection switch detects a state in which a memory card is fitted in an accommodating part of a housing through an insertion slot. The card detection switch has movable terminals and fixed terminals, and the movable terminals each have a card contact part which is displaced by being pressed by the memory card to be inserted, and a movable contact part which is displaced in a same direction as a direction in which card contact part is displaced following displacement of the card contact part. The fixed terminals are each arranged in the housing to project in a direction to interest the direction in which the movable contact part is displaced, and is slid against by the movable contact part when the movable contact part is displaced.

5 Claims, 8 Drawing Sheets

CARD CONNECTOR AND DETECTION SWITCH

CROSS REFERENCE TO RELATED APPLICATIONS

This application is entitled to and claims the benefit of Japanese Patent Application No. 2009-183760, filed on Aug. 6, 2009, the disclosure of which including the specification, drawings and abstract, is incorporated herein by reference in its entirety.

TECHNICAL FIELD

The present invention relates to a card connector that has a detection switch for detecting an electronic component such as a memory card to be inserted, and the detection switch.

BACKGROUND ART

Conventionally, memory cards having thin, flat housings made of resin are widely used as media for storing data in digital cameras, and small memory cards of various types and standards are known. Recently, memory cards are also used as media for storing data in mobile telephones, and very small memory cards are also available in the market.

Memory card connectors are provided in electronic devices such as digital cameras and mobile telephones which use these memory cards as storing media, so that the memory cards are fitted in the electronic devices by inserting them in the memory card connectors.

For example, as disclosed in Patent Literature 1, in such a memory card connector, a detection switch is provided for detecting the state of electrical connection of a memory card by making contacting portions of the memory card to be inserted in the connector body contact and part from the connector body. As a detection switch, there is a card detection switch for detecting insertion of a card.

FIG. 1 shows a conventional configuration of a card detection switch for detecting insertion of a memory card in a conventional memory card connector.

Conventional card detection switch 1 shown in FIG. 1 is provided on the one guiding sidewall 4 side of connector body 3 which extends along the insertion direction of memory card 2 to be fitted.

Card detection switch 1 is formed with second contact member 5 which is arranged along guiding sidewall 4 of connector body 3 and first contact member 6 which is arranged apart from second contact member 5 in the width direction.

First contact member 6 has curved part 7 which faces second contact member 5 in the width direction of connector body 3 and which projects from the guiding sidewall 4 side, into the route of insertion.

When memory card 2 is in a fitting position, curved part 7 of first contact member 6 is pushed by the lateral surface of memory card 2 and therefore the base end of curved part 7 abuts on second contact member 5, thereby placing first contact member 6 and second contact member 5 in an electrically conducting state (i.e. closed state).

In this way, with conventional memory card connectors, second contact member 5 and first contact member 6 are originally in the electrically disconnected state (i.e. open state) on one guiding sidewall 4 side along the insertion direction. By contrast with this, when a memory card is inserted, first contact member 6 deflects sideward and contacts second contact member 5, thereby placing second contact member 5 and first contact member 6 in an electrically conducting state. Further, when memory card 2 is removed from connector body 3, curved part 7 of first contact member 6 is recovered, thereby placing first contact member 6 and second contact member 5 in an electrically disconnected state. By so doing, insertion of a memory card is detected. Note that the ends of first contact member 6 and second contact member 5 are connected with a card detection circuit on a printed substrate (not shown) on which connector body 3 is mounted.

With this conventional memory card, in case where second contact member 5 is made of a flexible material, second contact member 5 is deflected by curved part 7 of first contact member 6, toward the side of memory card 2, that is, in a direction to part from this memory card 2. By this means, the contact points of first contact member 6 and second contact member 5 wipe (i.e. slide against) and contact each other, so that it is possible to prevent contact failure due to scrapes of the card between the contact points produced by contact between the lateral surface of the resin card and first contact member 6.

It is known that a detection switch disclosed in Patent Literature 2 employs a configuration having a wiping function where contact members contacting each other upon insertion of the card slide against each other.

With the detection switch of Patent Literature 2, the first contact member is arranged swingably along the insertion direction of the card, the front end part is molded to bend or curve in the surface direction of the card and the first contact point is formed in the rim of the front end part. Further, with the second contact member, the rear end part is molded to bend or curve in the thickness direction of the card, and the second contact point facing the first contact point is formed in the rim of the rear end part. According to Patent Literature 2, the first contact member is deflected by insertion of the card and the first contact point is displaced to the side of the card to press against the second contact point, so that the second contact point is displaced in the thickness direction of the card. In this way, according to Patent Literature 2, when the card is inserted, the first contact point and the second contact point contact each other sliding against (i.e. wiping) each other.

CITATION LIST

Patent Literature

PTL 1: Japanese Patent Application Laid-Open No. 2003-22870
PTL 2: Japanese Patent Application Laid-Open No. 2002-324629

SUMMARY OF INVENTION

Technical Problem

By the way, recently, an electronic device, on which a memory card is mounted, is miniaturized and, following this, there is a demand to miniaturize the memory card connector for mounting the memory card on the electronic device and save the footprint for mounting the connector.

The conventional memory card connectors disclosed in Patent Literature 1 and Patent Literature 2 each have a mobile area for the first contact member that moves to the side of the card when the memory card is inserted, and a mobile area for the second contact member that contacts the first contact member and deflects to the side of the card or in the thickness direction of the card.

Therefore, on the side of the memory card to be inserted, a space to allow the first contact member to move and a space to allow the second contact member to deflect both need to be secured in the connector body, and therefore there is a problem that this makes the outer shape of the connector itself bigger, making it difficult to miniaturize the connector.

It is therefore an object of the present invention to provide a card connector and a detection switch that can adequately detect the state in which an electronic device such as a memory card to be inserted or removed is fitted, and that can save the footprint for mounting the card connector.

Solution to Problem

To achieve the above object, the card connector according to the present invention employs a configuration which includes: a housing which forms an accommodating part accommodating a memory card that is inserted in an insertion slot; and a detection switch which is provided in the housing and which detects a state in which the memory card is fitted, the detection switch has: a movable terminal which has: a contact part which is displaced by being pressed by the memory card to be inserted; and a movable contact part which is displaced in a same direction as a direction in which the contact part is displaced following the displacement of the contact part; and a fixed terminal which is arranged in the housing to project in a direction to intersect the direction in which the movable contact part is displaced, and against which the movable contact part is displaced to slide.

The detection switch according to the present invention that is provided in a housing of a connector in which an electronic device is inserted through an insertion slot and that detects insertion of the electronic device, employs a configuration which includes: a movable terminal which has: a contact part which is displaced by being pressed by the electronic device to be inserted; and a mobile contact part which is displaced in a same direction as a direction in which the contact part is displaced following the displacement of the contact part; and a fixed terminal which is arranged in the housing to project in a direction to intersect the direction in which the mobile contact part is displaced, and against which the displacing mobile contact part slides.

ADVANTAGEOUS EFFECTS OF INVENTION

According to the present invention, it is possible to detect the state in which an electronic device such as a memory card to be inserted and removed is fitted, and save the footprint for mounting the card connector.

DESCRIPTION OF EMBODIMENTS

Hereinafter, an embodiment of the present invention will be explained in detail with reference to the following drawings. Although, with the present embodiment, a connector will be explained as a card connector in which a memory card is inserted as an electronic component, detection switches provided in this card connector may be any detection switches used for any electronic devices as long as they employ a configuration having the function of detecting the state in which an electronic device to be inserted is fitted.

Figure 1:
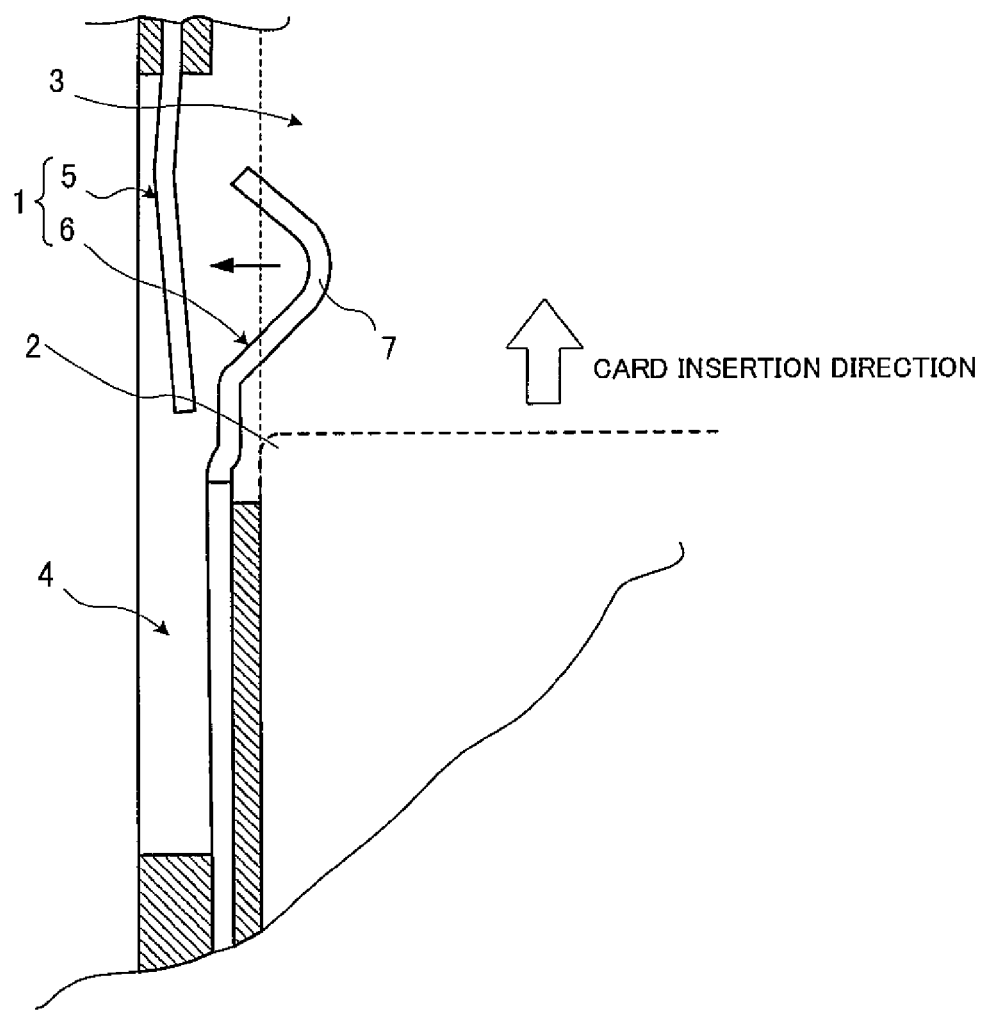
FIG. 1 shows a configuration of a card detection switch that detects insertion of a memory card in a conventional memory card connector.
Figure 2:
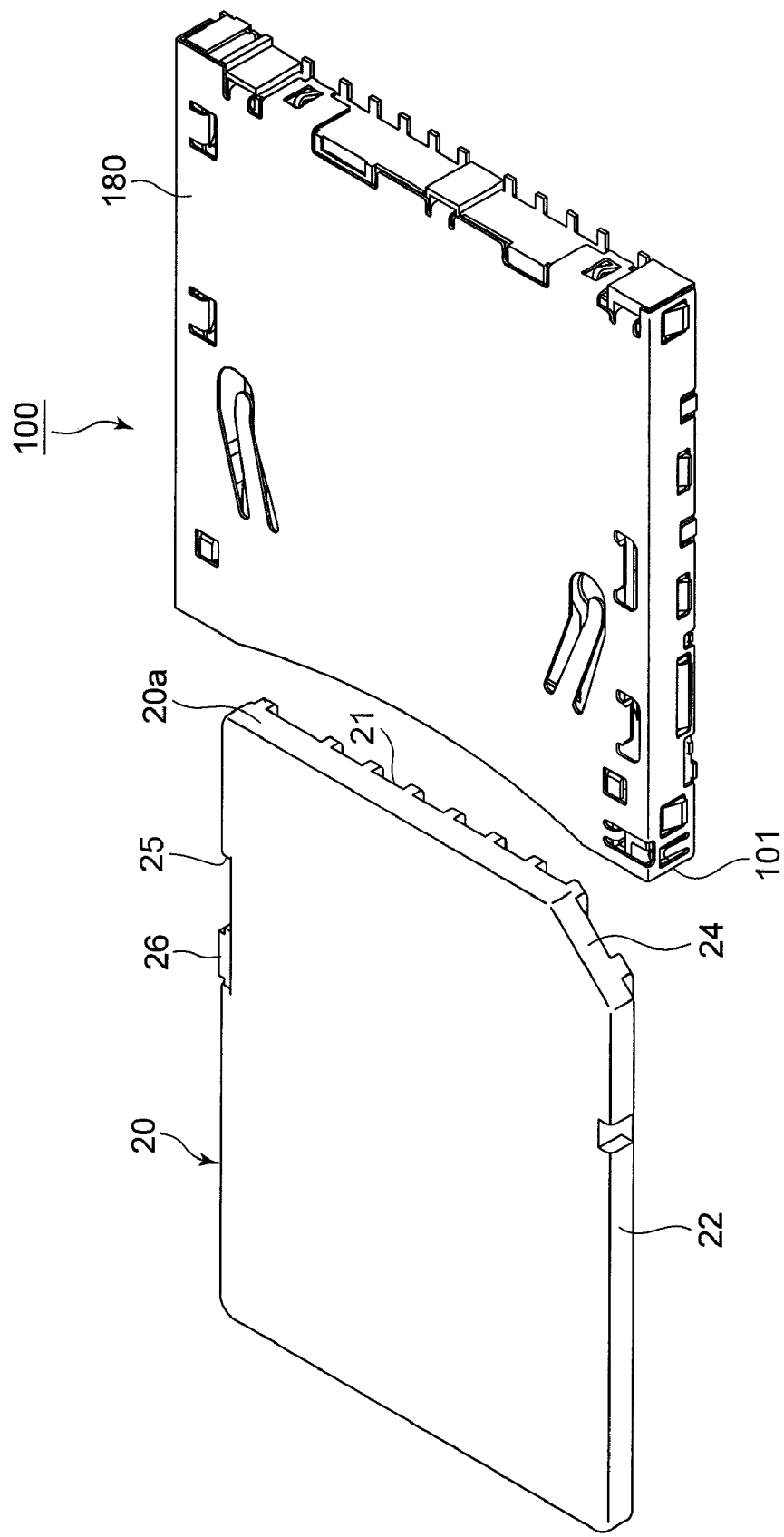
FIG. 2 is a perspective view showing a card connector according to an embodiment of the present invention and a memory card fitted in the card connector.
Figure 3:
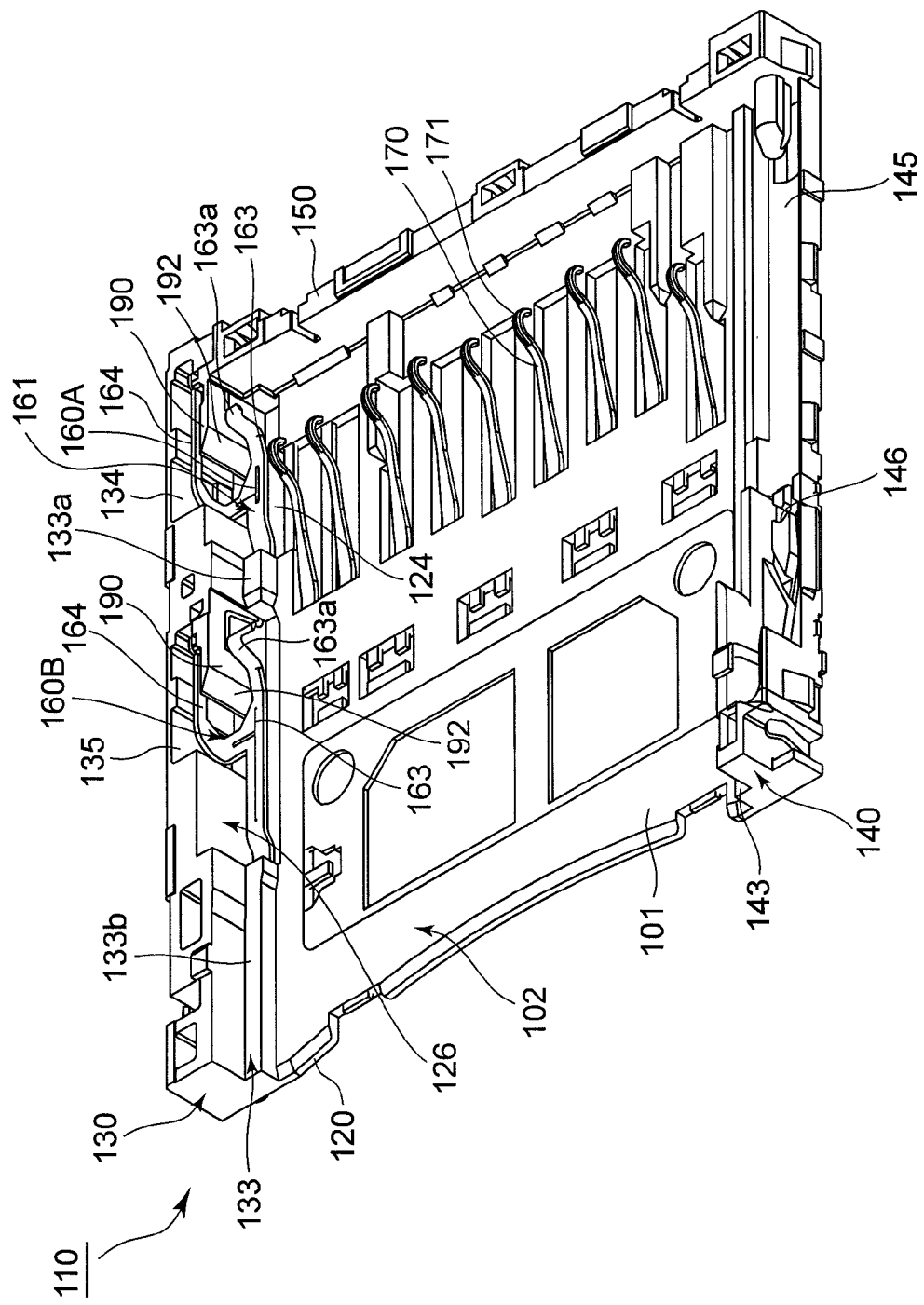
FIG. 3 is a perspective view of a housing having detection switches in the card connector according to the embodiment of the present invention.
Figure 4:
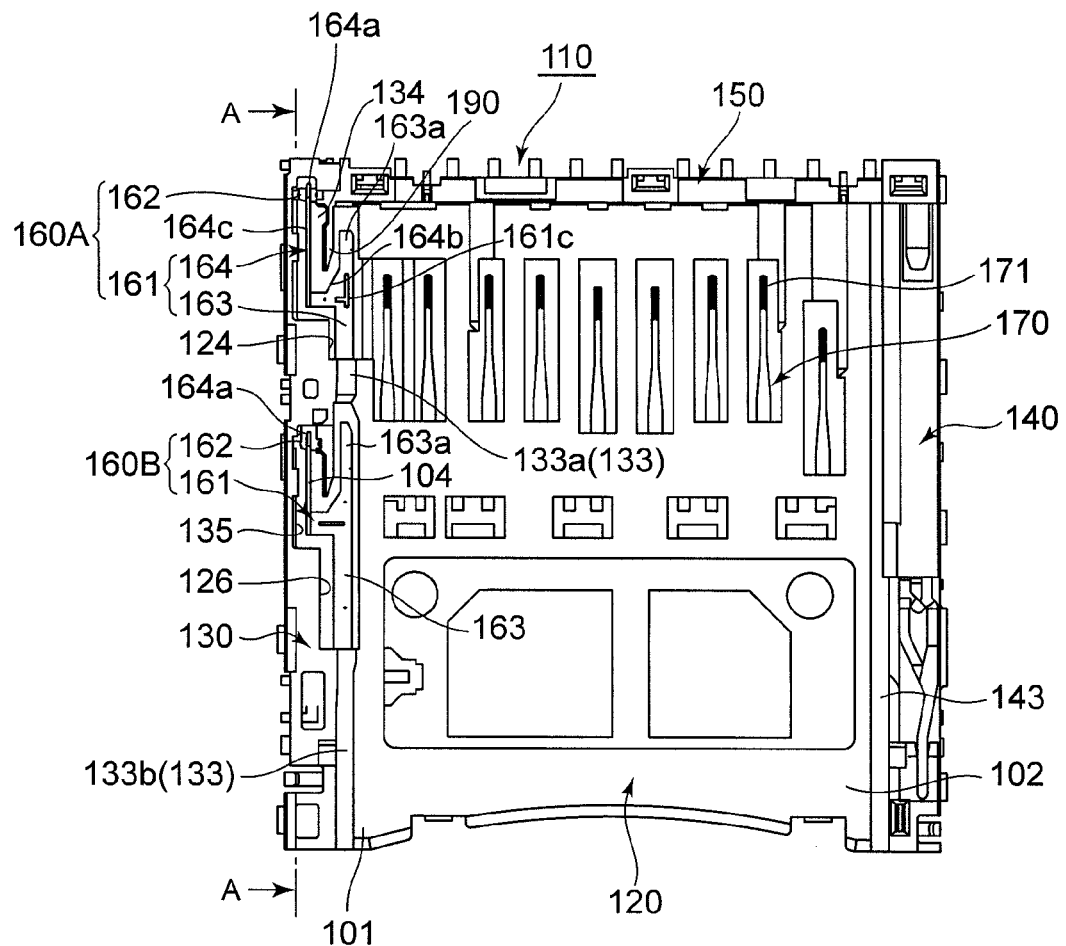
FIG. 4 is a plan view of the housing of the card connector according to the embodiment of the present invention.
Figure 5:
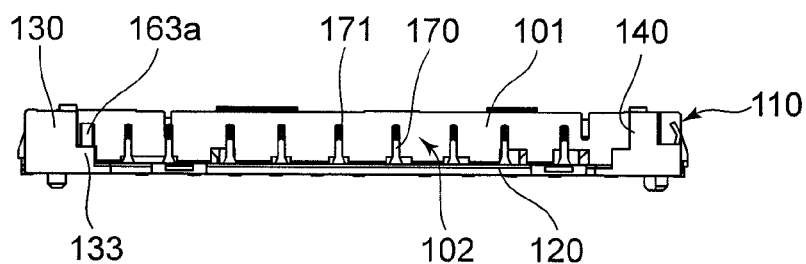
FIG. 5 is a front view of the housing of the card connector according to the embodiment of the present invention.

FIG. 2 is a perspective view showing a card connector according to an embodiment of the present invention and a memory card which is fitted in the card connector, and FIG. 3 is a perspective view of a housing which has detection switches in the card connector according to an embodiment of the present invention. FIG. 4 is a plan view of the housing of the card connector according to an embodiment of the present invention, and FIG. 5 is a front view of the housing of the card connector according to an embodiment of the present invention. Note that, with the present embodiment, insertion slot 101 in which the memory card is inserted is defined as the front, and with respect to the front, the rear, right and left of the card connector are defined.

Card connector 100 shown in FIG. 2 covers housing 110 (see FIG. 3) with shield cover 180 and has a flat rectangular shape that accommodates memory card 20 to be inserted in insertion slot 101 formed in the portion of one side surface. As shown in FIG. 3 and FIG. 4, card connector 100 has detection switches 160A and 160B inside.

As shown in FIG. 3, housing 110 is formed as a box which is made of an insulating material such as synthetic resin and which is open in the front surface and the upper surface and, has thin bottom plate part 120, both sidewall parts 130 and 140 and rear sidewall part 150. Accommodating part 102, which accommodates memory card 20 to be inserted, is formed by covering this housing 110 from above with shield cover 180 (see FIG. 2) having a U-shaped cross-section which is open downward.

Note that this card connector 100 is formed to match the shape of memory card 20 to be inserted. Memory card 20, which is fitted in card connector 100, generally has a flash memory, in which data can be freely deleted and written and is not erased even if power is turned off. Memory card 20 will be explained below.

Figure 6:
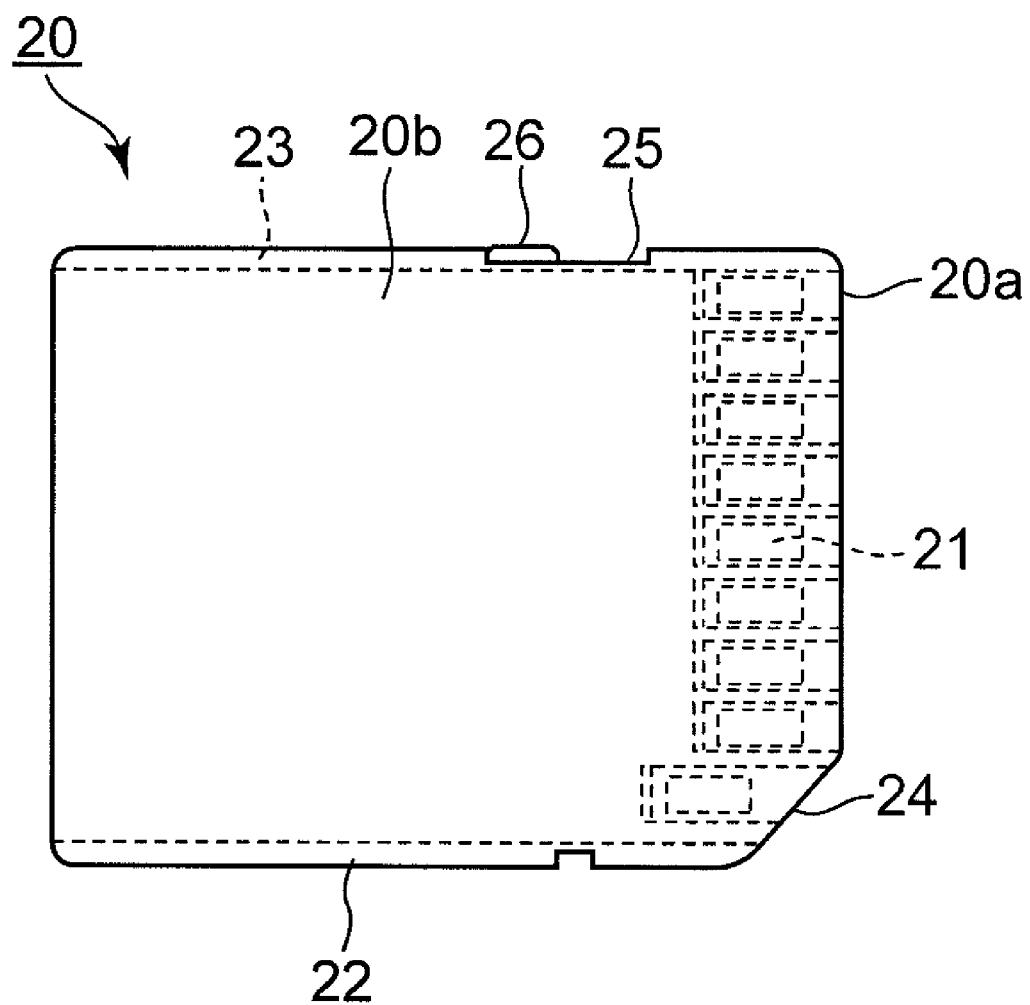
FIG. 6 is a plan view showing the memory card fitted in the card connector according to the embodiment of the present invention.

FIG. 6 is a plan view showing a memory card which is fitted in the card connector according to an embodiment of the present invention.

As shown in FIG. 6, memory card 20 is a thin flat resin plate which accommodates an IC (not shown) inside, and a plurality of electrodes 21 (i.e. pads), which connect with a plurality of contact pins 170 of housing 110, are disposed side by side in the width direction in the front end part in one surface (i.e. back surface) of memory card 20. Further, grooves which are open toward one surface (i.e. back surface) and toward the side (i.e. width direction) are formed along the longitudinal direction of both side parts 22 and 23 of memory card 20.

In memory card 20 of a rectangular shape from a plan view, notch part 24 is formed by cutting a corner part in other side part 22 of front side part 20*a* (i.e. the right side part assuming that the insertion direction side of memory card 20 with respect to card connector 100 is the front side). This notch part 24 makes front side part 20*a* of memory card 20 narrower toward the front side than the base side part.

Further, concave part 25, which functions as a distinguishing part for indicating that writing of data in the card is prohibited, is formed in one side part 23 of memory card 20 (i.e. the left side part assuming that the insertion direction side is the front side). Distinguishing chip 26 is arranged adjacent to this concave part 25 and slides toward concave part 25 along the direction in which other side part 23 of memory card 20 extends. By sliding this distinguishing chip 26, concave part 25 is shut, and whether or not data can be written in card 20 is changed depending on the position of distinguishing chip 26 inside concave part 25.

Although memory card 20 allows data to be read and written freely, memory card 20 that does not allow data to be copied may also be possible. Although this memory card 20 is an SD card (Secure Digital memory card), the present invention is not limited to this and PC cards, Compact Flash (registered trademark) cards, smart media, memory sticks and the like are equally possible.

As shown in FIG. 3 and FIG. 4, a plurality of contact pins 170 are provided side by side in the width direction, on the rear side of bottom plate part 120 in housing 110 in which memory card 20 is fitted. These contact pins 170 are flexible and are provided to project upward from bottom plate part 120. Projecting contact point parts 171 of contact pins 170 are contact point parts 171 which are arranged in positions inside accommodating part 102 to meet the pads (see FIG. 6) of memory card 20, and which flexibly move downward. These contact point parts 171 are pressed by electrodes 21 (see FIG. 6) of memory card 20 which is accommodated in accommodating part 102, so that contact point parts 171 each contact and electrically connect with corresponding electrode 21 in a pair.

Further, contact pins 170 attached to housing 110 are built into housing 110 by insertion molding together with other electrically conductive components which are attached to housing 110.

Both sidewall parts 130 and 140, which rise from both sides of bottom plate part 120 in housing 110, guide toward rear sidewall part 150 memory card 20 to be inserted inside card connector 100 through card insertion slot 101.

To be more specific, guide rails 133 and 143 projecting toward accommodating part 102 from the lower side parts of the inner wall surfaces of right sidewall part 130 and left sidewall part 140, are provided in right sidewall part 130 and left sidewall part 140. These guide rails 133 and 143 extend along the lower side parts of both sidewall parts 130 and 140 inside housing 110, and, on the upper surfaces of guide rails 133 and 143, adequately guide into accommodating part 102 both side parts 23 and 22 of memory card 20 to be inserted in insertion slot 101. Thus, when memory card 20 is accommodated in accommodating part 102, both side parts 22 and 23 of memory card 20 are placed on the upper surfaces of guide rails 133 and 143. Guide rails 133 and 143 slide along the groove parts formed in both side parts 22 and 23 of memory card 20 (see FIG. 6).

Notch parts 134 and 135, which are isolated from accommodating part 102 by isolating wall parts 190, are formed in one of both sidewall parts 130 and 140 in housing 110 (here, in right sidewall part 130) (see FIG. 4).

As shown in FIG. 4, notch parts 134 and 135 are formed inside sidewall part 130 along accommodating part 102 across isolating wall parts 190, and communicate with accommodating part 102 on the insertion slot 101 side. The communicating portions of notch parts 134 and 135 which communicate with accommodating part 102 communicate with opening parts 124 and 126 which are formed by cutting, toward the insertion slot 101 side, part of guide rail 133 and part of bottom plate part 120 including the portion adjacent to the communicating portions and by cutting, toward the insertion direction, bottom plate part 120 along isolating wall parts 190. Notch parts 134 and 135 and opening parts 124 and 126 form in housing 110 the areas to arrange detection switches.

In these areas to arrange the detection switches, card detection switch 160A and card write protect detection switch 160B (also referred to as "writable/unwritable detection switch") are arranged along the direction in which right sidewall part 130 extends, that is, along the insertion direction.

Figure 7:
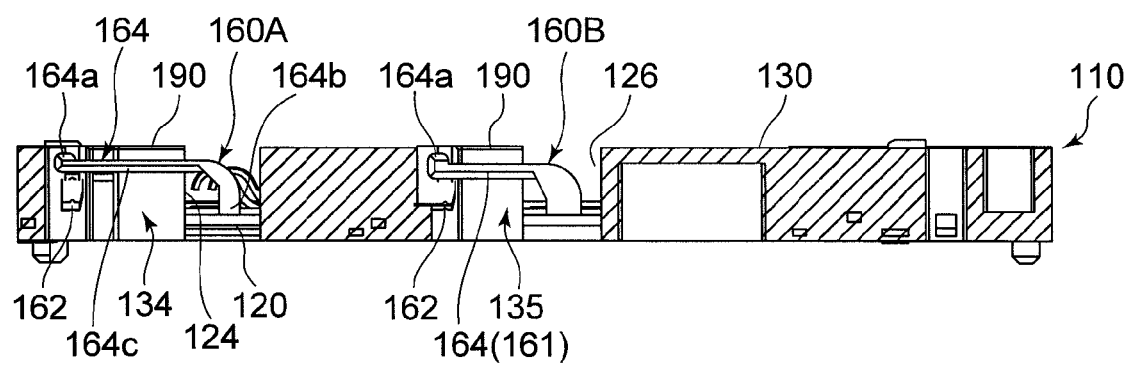
FIG. 7 is an end surface view showing notch parts of the housing from the A-A line of FIG. 4.

FIG. 7 is an end surface view showing notch parts 134 and 135 of the housing from the arrow view of the A-A line of FIG. 4.

Inside notch parts 134 and 135 shown in FIG. 3, FIG. 4 and FIG. 7, movable contact parts 164*a* of card detection switch 160A and card writable/unwritable detection switch 160B are arranged along right sidewall part 130.

Detection switches 160A and 160B shown in FIG. 3, FIG. 4 and FIG. 7 electrically detect memory card 20 to be inserted in accommodating part 102. To be more specific, card detection switch 160A detects memory card 20 itself (see FIG. 6) to be inserted in accommodating part 102, and writable/unwritable detection switch 160B detects the position of distinguishing chip 26 (see FIG. 6) of memory card 20 to be fitted by way of insertion.

Card detection switch 160A and writable/unwritable detection switch 160B have virtually the same configuration and functions and are attached in virtually the same way. Consequently, only the configuration of card detection switch 160A will be explained and writable/unwritable detection switch 160B will not be explained.

As shown in FIG. 4 and FIG. 7, card detection switch 160A has movable terminal 161 which is arranged swingably inside accommodating part 102 and which moves by being pressed by memory card 20 to be inserted, and fixed terminal 162 which is fixed on the housing 110 side.

Movable terminal 161 and fixed terminal 162 are made by processing metal plates.

As shown in FIG. 3 and FIG. 4, movable terminal 161 has card contact part 163*a* which contacts memory card 20 to be inserted, and movable contact part 164*a* which contacts card contact part 163*a* to contact and part from fixed terminal 162.

Movable terminal 161 is made of a long, elastic, electrically conductive material (here, metal plate), is provided to overhang from part of guide rail 133 (i.e. first guide rail 133*a*) and is elastically deformed, thereby allowing its tip part to swing inside the area to arrange the detection switch. Note that, with writable/unwritable detection switch 160B, movable terminal 161 is provided to project from second guide rail 133*b* (see FIG. 3 and FIG. 4).

To be more specific, movable terminal 161 is provided to extend on extension of first guide rail 133*a* from the end surface in the depths of first guide rail 133*a* along the insertion direction, and has movable arm part 163 which places its tip part inside accommodating part 102 communicating with the area to insert the card (see FIG. 3 and FIG. 4).

As shown in FIG. 3, FIG. 4 and FIG. 5, the tip part of movable arm part 163 placed in accommodating part 102 serves as card contact part 163*a* which contacts memory card 20 to be inserted in accommodating part 102.

Card contact part 163*a* is arranged along first guide rail 133*a* and is formed by bending its tip part toward accommodating part 102, and has an inclined surface inclining upward along the insertion direction. Card contact part 163*a* contacts memory card 20 to be inserted inside accommodating part 102, through this inclined surface, and moves toward bottom plate part 120 from accommodating part. 102 by being pressed in the insertion direction by memory card 20.

In this way, movable arm part 163 extends from the insertion slot 101 side along the insertion direction with respect to housing 110, swings around the base end part side, and card contact part 163*a* which is the tip part of movable arm part 163 located in accommodating part 102 is provided to be displaced in a direction to part from the inside of accommodating part 102.

Further, movable contact part 164*a* is formed at its tip part of movable arm part 163, and contact arm part 164 which extends along the direction in which movable arm part 163 extends is coupled to movable arm part 163.

As shown in FIG. 3, FIG. 4 and FIG. 7, contact arm part 164 is arranged inside notch part 134 of right sidewall part 130 which is formed along accommodating part 102, and is allowed to swing together with movable arm part 163.

Contact arm part 164 has contact arm part body 164*c* which extends along movable arm part 163, through coupling chip part 164*b* extending in a direction to intersect the direction in which movable arm part 163 extends, that is, toward right sidewall part 130. Movable contact part 164*a* is formed in the tip part of this contact arm part body 164*c*.

Coupling chip part 164*b* is arranged inside a communicating path through which opening part 124 and notch part 134 communicate. Note that both sides of this communicating path in the insertion direction are defined by right sidewall part 130 and isolating wall part 190 which partitions between notch part 134 and accommodating part 102.

As shown in FIG. 7, contact arm part body 164*c* extends from the tip part of coupling chip part 164*b* in the insertion direction of memory card 20, that is, toward the rear side of housing 110, and is arranged parallel to movable arm part 163.

Contact arm part 164 (to be more specific, contact arm part body 164*c*) is formed longer than movable arm part 163 from a plan view, and movable contact part 164*a* in the tip of contact arm part 164 is located closer to the rear side than card contact part 163*a* in the tip of movable arm part 163 (see FIG. 4).

With movable terminal 161 of the present embodiment, when contact arm part 164 is seen from a plan view, movable contact part 164*a* is positioned in the rear side, being spaced apart from card contact part 163 a length equal to the length from the base end part of movable arm part 163 to card contact part 163*a*.

Thus, the span from the base end part around which movable arm part 163 swings, to movable contact part 164*a*, is formed longer than the span from the base end part to card contact part 163*a*. By this means, when movable arm part 163 moves a certain range around the base end part, the amount of displacement of movable contact part 164*a* in the tip part of contact arm part 164 is greater than the amount of displacement of card contact part 163*a* in the tip part of movable arm part 163.

With movable terminal 161, movable arm part 163, contact arm part 164, movable contact part 164*a* and coupling chip part 164*a* are formed by processing one metal plate. That is, with movable terminal 161, a belt-shaped processed body, which has a branched belt-shaped part branched toward one side from the center portion of the belt portion by processing a metal plate, is formed. In this belt-shaped processed body, the belt-shaped portion is movable arm part 163, the branched belt-shaped part, which is the branched portion and which is branched horizontally, is coupling chip part 164*b*, the base end part of contact arm part 164 is formed by bending and raising the tip part of coupling chip part 164*b* projecting horizontally, and the stick member, which extends from this base end part along the longitudinal direction of movable arm part 163, is the main body of contact arm part 164. As movable contact part 164*a*, this contact arm part 164 forms the tip portion of the stick member which extends parallel to movable arm part 163 and which is longer toward the depths of the card connector than movable arm part 163.

Note that the jointing portion between movable arm part 163 and coupling chip part 164*b* is reinforced by limb 161*c*.

In movable terminal 161 configured in this way, fixed terminal 162 is arranged on the path of movable contact part 164*a* which is arranged inside notch part 134.

Figure 8:
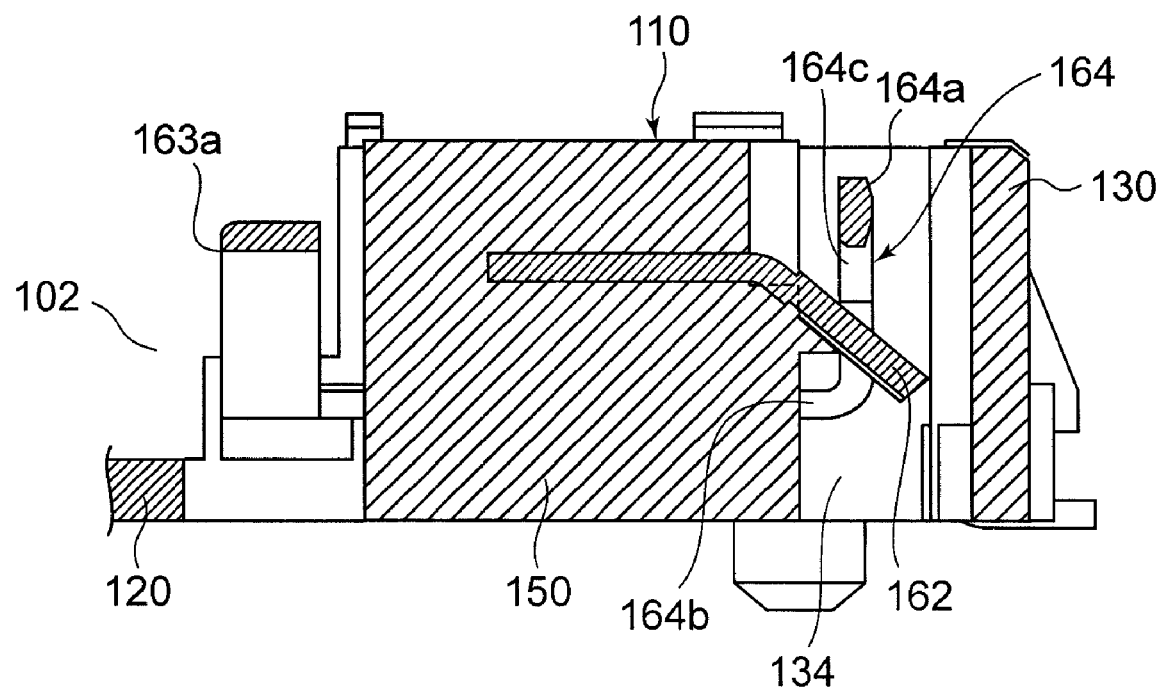
FIG. 8 shows the relationship between the positions of a fixed terminal and a contact part of a movable terminal.

FIG. 8 shows the relationship between positions of a fixed terminal and a contact part of a movable terminal, and is a main part cross-sectional view showing contacting portions of the fixed terminal and the movable terminal, from the depths of the card connector.

As shown in FIG. 8, fixed terminal 162 has a drawing shape, is provided to project from the lateral surface of notch part 134 to intersect the moving area in which movable contact part 164*a* of movable terminal 161 moves, into an area of notch part 134 formed by cutting a corner portion between rear sidewall part 150 and right sidewall part 130.

The direction in which fixed terminal 162 projects from the lateral surface of notch part 134 (to be more specific, from the portion of rear sidewall part 150 partitioning notch part 134 on the left side) is the direction inclining downward along the direction in which movable contact part 164*a* moves. By this means, movable contact part 164*a* moves, abuts on fixed terminal 162, and is fixed in contact with fixed terminal 162 while sliding on fixed terminal 162 in the inclining direction.

Note that fixed terminal 162 is formed to project inclining 45 degrees or more with respect to the vertical wall surface on the side of notch part 134. Fixed terminal 162 is provided at an angle more than 40 degrees and less than 90 degrees with respect to the horizontal plane, and, in the wall surface portion partitioning notch part 134 on the left side in the rear sidewall part, fixed terminal 162 is provided inclining about 45 degrees with respect to the vertical plane extending along the insertion direction.

In the normal state, fixed terminal 162 is arranged below movable contact part 164*a* inside notch part 134. On the upper surface of fixed terminal 162 (to be more specific, the surface facing movable contact part 164*a*), a projecting part, in which the upper end is curved and extends in the inclining direction, is formed. This projecting part contacts curved corner part 164*f* (see FIG. 9), which is chamfered in movable contact part 164*a*.

Fixed terminal 162 is in contact with movable terminal 161 when the card is not fitted. That is, card detection switch 160A is a normal open switch which is switched off (that is, electrically disconnected) when the card is not fitted.

Thus, in housing 110, a switch contacting portion (corresponding to a contacting area) that is an area in which movable contact part 164a of movable terminal 161 and fixed terminal 162 contact, and a card contacting portion (corresponding to a contacting area) that is an area in which card contact part 163a of movable terminal 161 and memory card 20 to be inserted contact, are partitioned by isolating wall part 190 arranged on the line connecting the switch contacting portion and the card contacting portion. In other words, on the virtually straight line connecting the portion of card contact part 163a contacting a contact target (i.e. memory card 20) and the contacting portion between movable contact part 164a and fixed terminal 162, isolating wall part 190 is provided to intersect this virtually straight line.

Isolating wall part 190 is part of right sidewall part 130, and its end part, which partitions the communicating path on the insertion direction side, has inclining surface 192 which inclines toward the insertion slot in the width direction to part from accommodating part 102.

That is, isolating wall part 190 defines accommodating part 102 adjacent to isolating wall part 190 in the width direction of housing 110, such that accommodating part 102 becomes narrower toward the rear side of housing 110, that is, in the insertion direction. This inclining surface 192 makes it possible to adequately guide into accommodating part 102 memory card 20 inserted by this inclining surface 192. Note that isolating wall part 190 is formed integrally with housing 110, and is reinforced by an electrically conductive metal member (here, metal plate) provided in housing 110 by insertion molding. To be more specific, isolating wall part 190 is formed with a metal chip which rises to extend in the insertion direction by bending the metal plate embedded virtually coplanar with the surface of bottom plate part 120, and a resin material covering the metal piece. In this way, isolating wall part 190 is reinforced by the inner metal chip.

Further, in other sidewall part 140 (i.e. left sidewall part 140) of both sidewall parts 130 and 140 in housing 110, an ejecting mechanism is disposed that includes: a slider which, when a card is inserted or removed, moves back and forth on the bottom surface of the housing along the insertion and removal directions of the memory card; and a coil spring which urges the slider toward the insertion slot of the memory card (although they are not shown). Further, the ejecting mechanism is a known technique of holding a memory card in two positions, namely, the insertion completion position where the memory card is inserted completely in connector 100, and the half-lock position for loosely holding the memory card in an insertion position before the insertion completion position, and therefore explanations thereof will be omitted. In FIG. 3, spring accommodating part 145 which accommodates the coil spring and heart-cam part 146 which locks the slider in the insertion completion position, are provided inside left sidewall part 140.

The operations of detection switches 160A and 160B in card connector 100 configured in this way will be explained.

Figure 9:
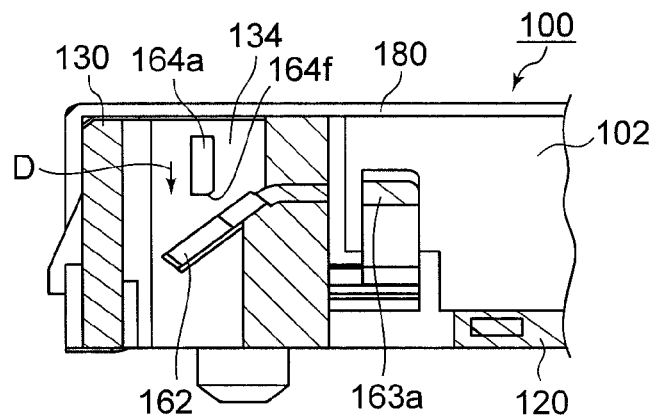
FIG. 9 illustrates an operation of a card detection switch in a card connector.
Figure 10:
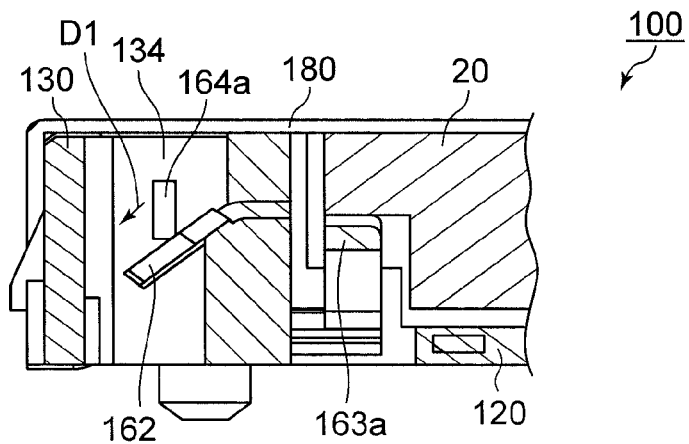
FIG. 10 illustrates an operation of a card detection switch in a card connector.
Figure 11:
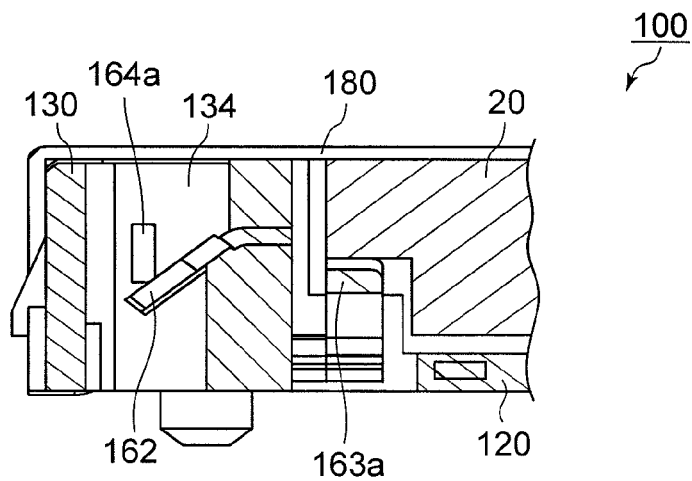
FIG. 11 illustrates an operation of a card detection switch in a card connector.

FIG. 9 to FIG. 11 illustrate the operation of detection switch 160A in card connector 100, and are main part cross-sectional views showing the relationship between the positions of movable contact part 164a and fixed terminal 162 inside notch part 134, in association with the position of card contact part 163a.

To be more specific, FIG. 9 and FIG. 10 show movable contact part 164a and fixed terminal 162 inside notch part 134, from the insertion slot 101 side, and FIG. 9 shows the original state, that is, the normal state, of detection switch 160A, FIG. 10 shows the state in which movable terminal 161 is moving in detection switch 160A, and FIG. 11 shows the state after movable terminal 161 moved in detection switch 160A.

With card connector 100, when memory card 20 is inserted in insertion slot 101, memory card 20 is guided by guide rails 133 and 143 of housing 110 and moves through accommodating part 102 toward rear sidewall part 150. At this time, in detection switch 160A, card contact part 163a positioned inside the area to accommodate memory card 20 is not in contact with memory card 20, and therefore in the original position of FIG. 9.

Memory card 20, which moves toward the rear side of housing 110 inside accommodating part 102, abuts on card contact part 163a projecting into accommodating part 102, and presses against card contact part 163a.

Card contact part 163a formed at the tip part of movable arm part 163 is pressed downward by memory card 20, so that movable arm part 163 itself elastically deforms and moves. Movable arm part 163 moves in this way, so that card contact part 163a is displaced downward and is placed inside opening part 124, and contact arm part 164 including movable contact part 164a also moves and is displaced downward (i.e. the direction approaching fixed terminal 162 shown by arrow D of FIG. 9).

As a result of displacement of contact arm part 164, movable contact part 164a formed at the tip of contact arm part 164 abuts on fixed terminal 162 below as shown in FIG. 10. To be more specific, movable contact part 164a moving downward abuts on the projecting part of fixed terminal 162 by chamfered corner part 164f (see FIG. 9).

Further, when memory card 20 is further inserted toward the depths of accommodating part 102, card contact part 163a moves further downward and is displaced, and, following this, contact arm part 164 also moves further downward. Following this motion, movable contact part 164a moves further downward inside notch part 134, and slides on the inclining upper portion of fixed terminal 162. At this time, with movable contact part 164a, curved corner part 164f (see FIG. 9) slides on the projecting part along the projecting part, in the direction of arrow D1, while abutting on the inclining projecting part of the upper surface of fixed terminal 162.

Then, when memory card 20 is accommodated in accommodating part 102, movable contact part 164a sliding on fixed terminal 162 stops in a state in which movable contact part 164a is pressed by fixed terminal 162 as shown in FIG. 11.

By this means, in a state where memory card 20 is accommodated in accommodating part 102 and is fitted completely in connector 100, memory card 20 is held in card connector 100 in a state where electrodes 21 and contact pins 170 are electrically connected.

At this time, in card detection switch 160A, movable terminal 161 and fixed terminal 162 are held contacting each other, that is, electrically conducting with each other. Thus, card detection switch 160A detects a state where the card is inserted completely, that is, a state where the card is fitted.

In this way, in card detection switch 160A, card contact part 163a is displaced downward by being pressed by memory card 20 to be inserted, and moves back from accommodating part 102. Following this backward movement of this card contact part 163a, movable contact part 164a moves in the same direction as card contact part 163a, and contacts and conducts with fixed terminal 162.

Further, in card detection switch 160A, movable contact part 164a moves, abuts on fixed terminal 162 and is fixed in contact with fixed terminal 162 while sliding on fixed terminal 162 in the inclining direction.

By this means, in card detection switch 160A, contacting portions between movable contact part 164a and fixed terminal 162 contact each other while sliding against each other, that is, contact each other while wiping each other. Thus, in card detection switch 160A, movable contact part 164a of contact arm part 164 in movable terminal 161 slides on, that is, slides down the inclining surface of fixed terminal 162, and, consequently, this cleans between movable contact part 164a and fixed terminal 162.

Accordingly, with card detection switch 160A, swinging of movable contact part 164a removes foreign material such as dust between movable contact part 164a and fixed terminal 162, prevents foreign material entering between movable contact part 164a and fixed terminal 162 and maintains a preferable conducting state or insulated state.

At this time, in card detection switch 160A, fixed terminal 162, which is one contact terminal, contacts movable contact part 164a of movable terminal 161 without deflecting itself. Therefore, apart from a conventional structure of the detection switch, only a mobile area for one of contacting terminals needs to be secured, and therefore both mobile areas for the contacting terminals need not to be secured.

Consequently, it is possible to save the space occupied by card detection switch 160A in the card connector, and miniaturize the card connector itself.

The span from the base end part around which movable arm part 163 swings, to movable contact part 164a is longer than the span from the base end part to card contact part 163a, and, therefore, when movable arm part 163 swings, the amount of displacement of movable contact part 164a is greater than the amount of displacement of card contact part 163a.

Consequently, even in case where the area in which movable arm part 163 deflects is limited, the amount of displacement of movable contact part 164a which is displaced following displacement of card contact part 163a is increased as much as possible, so that movable contact part 164a can be parted from fixed terminal 162 reliably.

Further, it is possible to secure a longer distance moving movable contact part 164a slides on fixed terminal 162, that is, secure a wider range of wiping.

By this means, even if card detection switch 160A is mounted in a limited space in the card connector having a shape matching the size of memory card 20, it is possible to perform adequate detection stably. That is, with card detection switch 160A, even in case where an area in which movable arm part 163 deflects is limited, a little deflection of movable arm part 163 widens the range in which movable contact part 164a slides against fixed terminal 162, so that it is possible to secure a range of cleaning as wide as possible in contacting portions between movable contact part 164a and fixed terminal 162.

Further, with detection switch 160A in card connector 100, it is possible to secure the range in which movable contact part 164a moves, as wide as possible in an area limited within the range of the thickness of memory card 20, and secure a sufficient contact pressure of movable terminal 161 against fixed terminal 162 (in other words, the force of movable terminal 161 to press against fixed terminal 162).

Further, chamfered corner part 164f (see FIG. 9) of movable contact part 164a abuts on the projecting part of fixed terminal 162, and, therefore, even if movable contact part 164a is displaced and pressed against fixed terminal 162 when movable arm part 163 moves, it adequately slides on fixed terminal 162 without damaging fixed terminal 162.

Further, write protect detection switch 160B also employs the same configuration as card detection switch 160A and is mounted on card connector 100 likewise, so that it is possible to provide the same operation and function as card detection switch 160A.

That is, with write protect detection switch 160B, card contact part 163a of movable terminal 161 projecting in accommodating part 102 is pressed by memory card 20 to be inserted (i.e. notch part of one side part 23 which defines the groove part), thereby placing movable contact part 164a and fixed terminal 162 in the contact state.

Consequently, similar to card detection switch 160A, with write protect detection switch 160B, even if a foreign material is sandwiched between the contacting portions of movable contact part 164a of movable terminal 161 and fixed terminal 162, it is possible to remove a foreign material in a portion in which movable contact part 164a and fixed terminal 162 contact and part from each other while sliding against each other.

Further, with write protect detection switch 160B, by securing a mobile range for movable contact part 164a as wide as possible, in an area limited within the range of the thickness of memory card 20, it is possible to secure a sufficient contact pressure of movable terminal 161 against fixed terminal 162.

When memory card 20 is fitted completely, if concave part 25 is shut by distinguishing chip 26 in memory card 20, card contact part 163a abuts on distinguishing chip 26 inside concave part 25 from below, and movable terminal 161 and fixed terminal 162 are kept in the contact state. By this means, the connector detects that writing is possible.

By contrast with this, in case where distinguishing chip 26 is not placed inside concave part 25 in memory card 20 and memory card 20 moves to the depths of accommodating part 102 and is inserted completely, card contact part 163a is placed inside notch concave part 25. That is, contact part 163a recovers projecting inside concave part 25 and, consequently, movable arm part 163 is restored and contact arm part 164 also comes back to the original state (i.e. electrically disconnected state). By this means, movable contact part 164a of contact arm part 164 parts from fixed terminal 162, thereby releasing the contact state (i.e. electrically conducting state) between movable terminal 161 and fixed terminal 162. Consequently, write protect detection switch 160B enters the open state and detects that writing is not possible.

In these card detection switch 160A and write protect detection switch 160B, insertion of memory card 20 makes movable terminals 161 move, and contact and part from fixed terminals 162.

When card detection switch 160A and write protect detection switch 160B operate in connector 100, respective card contact parts 163a repeat sliding against one side part 23 of memory card 20 to be inserted. In this way, the resin portion of one side part 23 of memory card 20 which contacts and slides against card contact part 163a is scraped and produces scrapes.

In card detection switch 160A and write protect detection switch 160B of card connector 100 according to the present embodiment, the card contacting portion between card contact part 163a and memory card 20, and a switch contacting portion (i.e. contacting area) between movable contact part 164a and fixed terminal 162 are arranged close to one sidewall part of housing 110 (here, right sidewall part 130).

Further, these card contacting portion and switch contacting portion are partitioned by isolating wall part 190 which is arranged on the line connecting the card contacting portion and the switch contacting portion. That is, the switch contacting portion is isolated by isolating wall part 190 from accommodating part 102 in which card contact part 163a is located.

In this way, with the present embodiment, in housing 110 which has accommodating part 102 accommodating memory card 20 to be inserted in insertion slot 101, card detection switch 160A (i.e. detecting part) and writable/unwritable detection switch 160B (i.e. detecting part) are provided.

Card detection switch 160A completely fits memory card 20 in accommodating part 102, and writable/unwritable detection switch 160B (i.e. detecting part) detects whether or not data can be written in memory card 20. Further, writable/unwritable detection switch 160B employs the same configuration as card detection switch 160A, and has fixed terminal 162 which is fixed in housing 110 and movable terminal 161 which is arranged to extend from the insertion slot 101 side in the insertion direction and which deflect and deform to swing.

Movable terminal 161 has: card contact part 163a which is arranged projecting in accommodating part 102 and which is pressed by memory card 20 to be inserted in accommodating part 102 and moves backward from accommodating part 102 toward the partitioning wall part (i.e. bottom plate part 120) that partitions accommodating part 102; and movable contact part 164a which, following this movement (i.e. displacement) of card contact part 163a, moves (that is, displaced) in the same direction as card contact part 163a, and contacts and conducts with fixed terminal 162.

Movable terminals 161 are made by processing a long metal and extend in the insertion direction from the insertion slot side. Card contact parts 163a are tip parts of movable arm parts 163 which project in accommodating part 102, and are allowed to move backward from accommodating part 102 by the movement of movable arm parts 163. Contact arm parts 164 are formed to branch out from movable arm parts 163 and extend in the direction of fixed terminals 162, and move following the movement of movable arm parts 163, thereby placing movable contact parts 164a of the tip parts in contact with fixed terminals 162 while sliding against fixed terminals 162, to conduct with fixed terminals 162.

Further, isolating wall part 190 which isolates a contacting area between movable contact part 164a and fixed terminal 162 from a contacting area between card contact part 163a and memory card 20, is provided between card contact part 163a and movable contact part 164a inside housing 110. That is, with card connector 100, isolating wall part 190 isolates from accommodating part 102 the switch contacting portions between movable terminals 161 and fixed terminals 162 in respective card detection switch 160A and write protect detection switch 160B.

Therefore, even when dust enters accommodating part 102, contact failure in switch contacting portions hardly occurs, and movable terminals 161 and fixed terminals 162 can be adequately made contact and part from each other.

Consequently, even if scrapes are produced when memory card 20 contacts and slides against card contact parts 163a due to insertion and removal of memory card 20, isolating wall parts 190 prevent the scrapes from moving to switch contacting portions between movable contact parts 164a and fixed terminals 162.

By this means, contact failure does not occur due to scrapes produced in switch contacting portions between movable contact parts 164a and fixed terminals 162, so that it is possible to detect that memory card 20 is inserted and detect whether or not data can be written in memory card 20.

Thus, according to the present embodiment, it is possible to miniaturize the card connector and save a footprint for mounting the card connector following the trend of miniaturizing memory card 20 to be inserted and electrically connected, and adequately place each switch 160A and 160B in the contact state even when scrapes are produced from the housing of memory card 20 due to insertion and removal of memory card 20. Consequently, it is possible to adequately detect that memory card 20 is inserted and detect whether or not data can be written in memory card 20 which is fitted by way of insertion.

Note that, although a configuration is employed with the present embodiment where fixed terminals 162 are projected inclining downward from the left wall surface inside notch part 134 of housing 110 in which movable contact parts 164a move, the present invention is not limited to this, and fixed terminals 162 may be provided in any way as long as they are configured to be held in a contact state with movable contact parts 164a after movable contact parts 164a of movable terminals 161 slide against fixed terminals 162. For example, it is possible to provide fixed terminal 162 to project from the right sidewall part which partitions notch part 134 on the right side, toward the left sidewall surface which partitions notch part 134 on the left side inclining downward, and keep the contact state between fixed terminal 162 and movable contact part 164a while movable contact part 164a moving downward slides against fixed terminal 162.

Further, although a configuration is employed in which movable contact part 164a is provided in housing 110 to slide toward the tip of the free end from the base end part of fixed terminal 162, movable contact part 164 may be provided to slide from the tip toward the base end.

Further, although card detection switch 160A and write protect detection switch 160B are normal open switches in card connector 100 according to the present embodiment, the present invention is not limited to this and may be normal close switches. In this case, insertion of the card is detected when fixed terminals 162 part from movable terminals 161 upon insertion of the card.

Further, although memory card 20 with electrodes 21 is fitted in card connector 100 by way of insertion according to the present embodiment and electrodes 21 are electrically connected with contact pins 170, any electronic memory card may be fitted in card connector 100 as long as it can be inserted and electrically connected with card connector 100.

Further, the above present invention can be variously modified without departing from the spirit of the present invention, and it naturally follows that the present invention covers such modifications.

INDUSTRIAL APPLICABILITY

The card connector and the detection switch according to the present invention can adequately detect the state in which an electronic device such as a memory card is inserted or removed, provides an advantage of saving the footprint for the mounting card connector, and is particularly useful as a memory card connector.

REFERENCE SIGNS LIST

20 MEMORY CARD
21 ELECTRODE
100 CARD CONNECTOR
101 INSERTION SLOT
102 ACCOMMODATING PART
110 HOUSING
120 BOTTOM PLATE PART
124 OPENING PART
130 RIGHT SIDEWALL PART
134, 135 NOTCH PART
160A CARD DETECTION SWITCH
160B WRITE PROTECT DETECTION SWITCH

161 MOVABLE TERMINAL
162 FIXED TERMINAL
163 MOVABLE ARM PART
163a CARD CONTACT PART
164 CONTACT ARM PART
164a MOVABLE CONTACT PART

The invention claimed is:

1. A card connector comprising:
a housing which forms an accommodating part accommodating a memory card that is inserted in an insertion slot; and
a detection switch which is provided in the housing and which detects a state in which the memory card is fitted, wherein the detection switch comprises:
a movable terminal comprising:
a contact part which is displaced by being pressed by the memory card to be inserted; and
a movable contact part which is displaced in a same direction as a direction in which the contact part is displaced following the displacement of the contact part; and
a fixed terminal which is arranged in the housing to project in a direction to intersect the direction in which the movable contact part is displaced, and against which the movable contact part is displaced to slide,
wherein the movable contact part comprises a curved corner part which slides against the fixed terminal when the movable contact part is displaced.

2. A detection switch that is provided in a housing of a connector in which an electronic device is inserted through an insertion slot and that detects insertion of the electronic device, the detection switch comprising:
a movable terminal which comprises:
a contact part which is displaced by being pressed by the electronic device to be inserted; and
a movable contact part which is displaced in a same direction as a direction in which the contact part is displaced following the displacement of the contact part; and
a fixed terminal which is arranged in the housing to project in a direction to intersect the direction in which the movable contact part is displaced, and against which the displacing movable contact part slides,
wherein the movable contact part comprises a curved corner part which abuts on the fixed terminal when the movable contact part is displaced.

3. The card connector according to claim 1, wherein an isolating wall part which isolates a contacting area between the movable contact part and the fixed terminal from a contacting area between the contact part and the memory card, is provided between the contact part and the movable contact part inside the housing.

4. The card connector according to claim 1, wherein:
the movable terminal is provided in the housing to extend along an insertion direction and deflect and deform to swing around an end part of a base end; and
the movable contact part of the movable terminal is formed in a deeper side of the housing than the contact part.

5. The card connector according to claim 1, wherein:
the movable terminal comprises:
a movable arm part which is arranged along an insertion direction and which deforms due to deflection and swings; and
a contact arm part which is formed to branch from the movable arm part to outside of the accommodating part and in which a tip part is positioned in a deeper side of the housing than a tip part of the movable arm part;
the contact part is provided to project from an end part on an insertion direction side of the movable arm part, to inside of the accommodating part, and is displaced in a direction to move back from the accommodating part by being pressed by the memory card, thereby swinging the movable arm part; and
the movable contact part is formed in a tip part of the contact arm part, and abuts on and slides against a fixed terminal due to swinging of the contact arm part following switching of the movable arm part.

* * * * *